No. 858,999. PATENTED JULY 2, 1907.
E. MAISONGRANDE.
HEADLIGHT FOR VEHICLES.
APPLICATION FILED SEPT. 12, 1905.
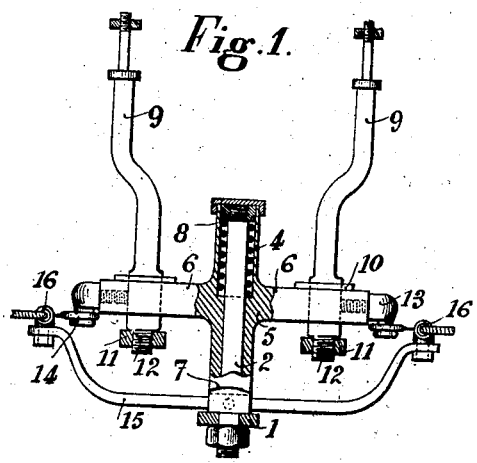
Fig. 1.
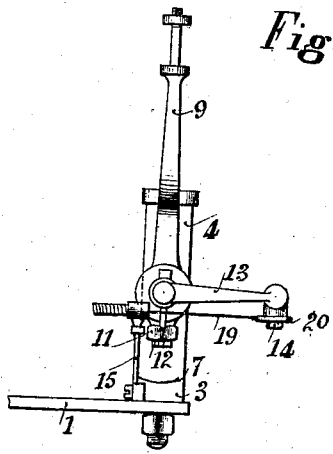
Fig. 2.
Fig. 3.
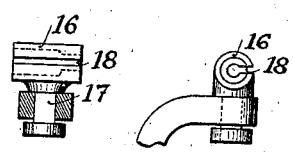
Fig. 4.
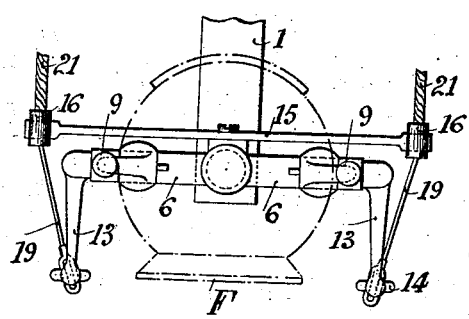
Fig. 5.
Fig. 7. Fig. 6.
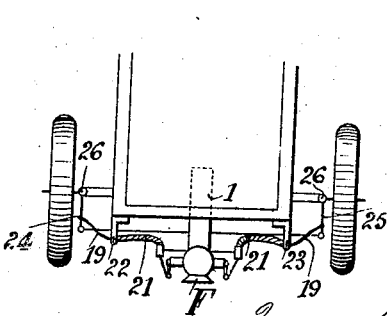
Witnesses:
Geo. Heinicke
F. Dittmar.
Inventor:
Edmond Maisongrande
by G. Dittmar
Attorney

UNITED STATES PATENT OFFICE.

EDMOND MAISONGRANDE, OF ANGERS, FRANCE.

HEADLIGHT FOR VEHICLES.

No. 858,999.   Specification of Letters Patent.   Patented July 2, 1907.

Application filed September 12, 1905. Serial No. 278,130.

*To all whom it may concern:*

Be it known that I, EDMOND MAISONGRANDE, a citizen of the French Republic, residing at Angers, in France, have invented certain new and useful Improvements in Headlights for Vehicles, of which the following is a specification.

My invention relates to improvements in headlight and other illuminator supports for motor and other vehicles, and it has for its main object the provision of a headlight support and coacting mechanism, whereby the position of the illuminator may be automatically regulated in accordance with a change in direction of the vehicle so that when the vehicle is describing a curve, the headlight will be turned to illuminate the path upon which the vehicle is about to enter, and when the car resumes its travel along a straight line the headlight will be automatically returned to its normal position.

My invention therefor consists in the novel construction and combination of parts for accomplishing the foregoing and hereinafter described objects substantially as illustrated in the accompanying drawings and as hereinafter described and claimed.

In the accompanying drawings illustrating a preferred form of embodiment of my invention. Figure 1 is a front view, partially in section, of my device. Fig. 2 is a side view. Fig. 3 is a plan view showing the lamp in dotted lines. Fig. 4 shows in detail a support and guide for the actuating cables. Fig. 5 is a front elevation of a motor vehicle, showing the application thereto of my device. Fig. 6 is a plan view of Fig. 5, the car being shown as when moving in a straight line. Fig. 7 is a view similar to Fig. 6, the car being shown as when describing a curve.

1 indicates a bar of suitable form by means of which the device is secured to a motor vehicle of any type. 2 is a rod having a screw threaded end which pierces the bar 1 and is secured thereto by a nut as shown. The rod 2, where it rests upon the bar 1, is provided with an enlargement 3 which forms a bearing or support for the central stem 4 of a rotatable headlight support 5. The upper surface of the bearing 3 does not lie in a horizontal plane, but is formed by two reverse curves one continuing from the other. This surface of the bearing is thus formed with two high points along the curve, one at the front as shown in Fig. 1 and a corresponding one at the rear, and consequently two low points one at each side, one of the low points being shown in Fig. 2. The bottom of the stem 4 is shaped to follow the curvature of the upper surface of the bearing 3, and when the headlight is in its normal position, the curved surfaces are in contact at all points, the convex portion of one entering the concave portion of the other. The stem 4 is held in this relation to the bearing 3 by means of a spring 8 which is seated in a recess in the upper end of the stem 4 and is held between a nut on the upper end of the rod 2 and the inner end of the recess. The support 5 is provided with two oppositely disposed laterally projecting branches 6, which carry the headlight supporting rods 9. These rods 9 embrace the branches 6 and are laterally adjustable thereon, the branches being provided with fixed feathers 10, which engage slots in the rods 9 as shown. The portion of each rod 9, that is below the branches 6 is split, and is formed with a tapering screw threaded extremity 12 which is engaged by a nut 11, by means of which the rod may be clamped in any adjusted position along a branch 6.

Each of the branches 6 is provided at its outer extremity with a screw threaded socket, which receives a screw-threaded projection of an arm 13. These arms project forward at right angles to the branches 6 and each arm carries at its outer end a downwardly depending hook 14, which is engaged by a slotted link 20, attached to one end of a flexible cable 19, the other end of which is secured to a coacting axle lever as shown at 24, and 25. The cables 19 work through, and are supported in guides 16 which are pivotally mounted as at 17 upon opposite elevated extremities of a bracket 15 which is secured to the rear side of the bearing 3. The guides 16 as shown in Fig. 4, are each formed with a circular recess or socket, terminating in a circular opening of smaller diameter. The larger recess forms a retaining seat for one end of an incompressible, flexible cover 21 which surrounds the cable 19 for a portion of its length. This end of the cover 21 enters the larger recess of the guide 16 and abuts against the end wall through which the contracted opening passes.

The ends of the outer covers 21 opposite to those seated in the guide 16 are held by brackets 22 and 23. The guides 16 are formed with side slots 18, which communicate with the circular openings. These slots enable a cable 19 to be inserted through the side of its guide without necessitating the passing of the end of the cable through the small hole at the end of the guides, thus obviating the necessity for removing the links 20.

The operation of the device is as follows: Assuming the vehicle to be traveling in a straight line as shown in Fig. 6, the cables 19 not being drawn in either direction, do not therefore affect the position of the headlight F, which points straight ahead forming an illuminated path, whose center coincides substantially with the projected center line of the car. The parts are now in their normal position, being held there by the pressure of the spring 8, which, pressing the stem 4 downwardly, holds its curved projections within the corresponding recesses of the bearing 3. As soon however as the vehicle commences to describe a curve, and departs to the extent of two or five degrees from a straight line, the movement of that axle lever, which is on the inner line of the curve draws upon its attached cable, which by means of its connection to its coacting arm 13, rotates the support 5 about the stationary rod 2, the convex projections at the base of the stem 4, riding up upon convex projections of the bearing 3, thus compressing the spring 8. The headlight is now turned so that the path of illumination is approximately parallel to the direction of the front wheels as they describe the curve. When the vehicle starts to again assume a straight line, with the front wheels parallel to the body of the vehicle, the tension being thereby removed from the previously drawn cable, the spring 8 being free to act forces downwardly the stem 4, the curved projections thereof riding down along the curved projections of the bearing 3, until the projections of the stem 4 reach their normal position in the correspondingly shaped recesses of the enlargement 3. The support 5 is thus rotated back to its original position. The spring 8 assures the prompt return of the headlight to its normal position, and also assures its maintainance in that position unless positively acted upon by one of the cables.

The cables 19 are of such a length that the headlight is not affected by such slight and sudden changes of direction as may result from unskilful or careless steering.

If the bar connecting the axle-levers be placed behind the spindles instead of in front as shown by the drawing, the cables should be crossed.

Having thus described my invention, what I claim is:

1. In a device of the character described, the combination with a fixed member rigidly secured to a fixed part of a vehicle, of a rotatable member mounted to turn on the fixed member and having oppositely disposed branches, headlight supporting rods adjustably carried by the branches, an outstanding arm secured to each branch of the rotatable member, a bracket secured to the fixed member, guides carried by the vehicles, a cable passing through each pair of guides and secured at one end to an outstanding arm and secured at the other end to an axle lever, and a spring held between the fixed member and the rotatable member and adapted to cause the rotation of the latter to its normal position when it is not positively withheld therefrom.

2. The combination with a fixed member having a base whose top is defined by reversed curves which form the base with two high and two low points, the base having also a rod projecting therefrom; of a rotatable member mounted upon the rod and having a central stem with oppositely disposed branches projecting laterally therefrom, the bottom of the central stem being shaped to follow the curvature of the top of the base of the fixed member, rods adjustably supported by the branches; and a spring seated in a recess formed in the central stem and held between a nut on the rod of the fixed member and the shoulder of the recess and adapted to be compressed by the turning of the rotatable member, from its normal position and also adapted by its subsequent expansion to return said member to its normal position.

3. The combination with a fixed member having a base whose top is defined by reversed curves and having also a rod projecting from the base, of a rotatable member mounted upon said rod and having a central stem whose lower face is shaped to coact with the curved base of the fixed member, the rotatable member being provided also with horizontally disposed branches, and a spring seated in a recess formed in the central stem, and held between the rod of the fixed member and the shoulder of the recess and adapted to yieldingly hold the stem in contact with the base of the fixed member.

In testimony whereof I affix my signature.

EDMOND MAISONGRANDE.

In presence of—
ERNEST RIQUIER,
CHARLES LAURENT.